United States Patent
Florin

(10) Patent No.: US 11,124,279 B2
(45) Date of Patent: Sep. 21, 2021

(54) SUBMARINE VEHICLE AND CONTROL METHOD

(71) Applicant: THALES, Courbevoie (FR)

(72) Inventor: Franck Florin, Brest (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/763,159

(22) PCT Filed: Dec. 28, 2018

(86) PCT No.: PCT/EP2018/097101
§ 371 (c)(1),
(2) Date: May 11, 2020

(87) PCT Pub. No.: WO2019/129863
PCT Pub. Date: Jul. 4, 2019

(65) Prior Publication Data
US 2020/0391837 A1 Dec. 17, 2020

(30) Foreign Application Priority Data
Dec. 28, 2017 (FR) ....................... 1701396

(51) Int. Cl.
*B63G 8/00* (2006.01)
*B63G 8/16* (2006.01)
(Continued)

(52) U.S. Cl.
CPC .............. *B63G 8/001* (2013.01); *B63G 8/16* (2013.01); *B63G 8/39* (2013.01); *G01S 15/8904* (2013.01); *H01Q 1/34* (2013.01); *B63G 2008/007* (2013.01)

(58) Field of Classification Search
CPC . B63G 8/00; B63G 8/001; B63G 8/08; B63G 8/16; B63G 8/39; G01S 15/88;
(Continued)

(56) References Cited

U.S. PATENT DOCUMENTS 6,390,012 B1 * 5/2002 Watt .................. B63G 8/001
114/322
9,090,319 B2 * 7/2015 Brizard ................ G01V 1/3852
(Continued)

FOREIGN PATENT DOCUMENTS

EP    0 070 494 A1    1/1983
GB    2 521 681 A    7/2015

*Primary Examiner* — Lars A Olson
(74) *Attorney, Agent, or Firm* — BakerHostetler

(57) ABSTRACT

An underwater vehicle includes a propeller able to propel the vehicle, the vehicle comprising a synthetic aperture sonar comprising a set of at least one physical antenna for receiving acoustic waves, the underwater vehicle comprising a connector able to mechanically couple removably a cable to the vehicle so as to allow the underwater vehicle to be towed by a surface vehicle. The physical receiving antenna comprises a plurality of acoustic sensors, the underwater vehicle comprising an electrical network able to convey electrical power to the receiving antenna, the electrical network being configured so as to have a plurality of states wherein it conveys electrical power to different sets of acoustic sensors containing different respective numbers of acoustic sensors.

17 Claims, 4 Drawing Sheets

(51) Int. Cl.
*B63G 8/39* (2006.01)
*G01S 15/89* (2006.01)
*H01Q 1/34* (2006.01)

(58) Field of Classification Search
CPC ........ G01S 15/8904; H01Q 1/34; G01V 1/38; G01V 1/247; G01V 1/3843; G01V 1/3852
USPC .......................................................... 114/312
See application file for complete search history.

(56) References Cited

U.S. PATENT DOCUMENTS

| | | | |
|---|---|---|---|
| 9,873,496 B2* | 1/2018 | Rokkan | G01V 1/3852 |
| 10,322,783 B2* | 6/2019 | Valsvik | G01V 1/3852 |
| 10,543,892 B2* | 1/2020 | Postic | G01V 1/247 |
| 2012/0250457 A1 | 10/2012 | Rickert, Jr. et al. | |

\* cited by examiner

SUBMARINE VEHICLE AND CONTROL METHOD

CROSS-REFERENCE TO RELATED APPLICATIONS

This application is a National Stage of International patent application PCT/EP2018/097101, filed on Dec. 28, 2018, which claims priority to foreign French patent application No. FR 1701396, filed on Dec. 28, 2017, the disclosures of which are incorporated by reference in their entirety.

FIELD OF THE INVENTION

The field of the invention is that of unmanned underwater vehicles (UUV) and especially that of autonomous underwater vehicles or underwater drones.

Synthetic aperture sonars (SAS) are used to explore the seabed, especially in the field of mine warfare, with a view to detecting, identifying and potentially locating objects located on the seabed.

BACKGROUND

The aim of SAS is to improve resolution, at a given range, without increasing the linear dimension of the receiving antenna. The principle of synthetic aperture sonar consists in using a physical antenna formed by a linear array of N transducers, i.e. N acoustic sensors. In this type of sonar, during the advance of the carrier, a transmitting device, or transmitting antenna, transmits P successive pulses into an elementary sector that remains stationary with respect to the carrier. The signals received by the N transducers of the physical receiving antenna at P times, and therefore at P successive locations, are used to form the beams of the synthetic antenna. The resolution of the obtained images, i.e. the resolution of the beams of synthetic antennas, is substantially equivalent to that of a virtual antenna the length of which corresponds to about twice the length traveled by the physical antenna during these P successive times.

SAS are mounted on self-propelled underwater vehicles, or on towed fish devoid of propellers.

Towed fish are pulled by a surface vehicle by means of an electrical tug cable. The sonar is powered electrically by the surface vehicle via the cable and measurements taken by the sonar are transmitted to the surface via the cable in order to allow processing in real-time on board the surface vehicle and/or transmission by radio to a land-based processing center.

Autonomous underwater vehicles equipped with a SAS are provided with a propeller powered by batteries located on-board the vehicle. One advantage of SAS imaging with autonomous vehicles is their ability to take images at large depth, because of the absence of cable connecting the underwater vehicle to another vehicle and therefore the absence of drag due to the cable.

The difference between towed-sonar and autonomous-vehicle solutions mainly resides in their ability to cover an extensive zone and in the processing of the data.

A towed fish equipped with a SAS requires a powerful surface vessel to be employed to tow the fish, and as a result the speed of the fish may be relatively fast (about 10 knots) and the imaging coverage rate relatively high. Technically, the high-speed requires a relatively long SAS receiving antenna in order to obtain a high coverage rate because, the higher the speed of the vehicle, the greater the distance travelled by the vehicle and the longer the antenna must be to cover the movement of the vehicle between two transmitted acoustic pulses.

The power supply and therefore the speed of autonomous underwater vehicles equipped with SAS are limited. They are thus conventionally equipped with shorter SAS receiving antennas and can only achieve a lower coverage rate (area of the zone imaged per hour). The receiving antennas of SAS installed on towed fish typically have a length comprised between 1.5 m and 2.5 m and allow a coverage rate higher than underwater drones, whereas the receiving antennas of SAS installed in self-propelled underwater vehicles comprise receiving antennas typically of about 0.5 to 1.5 m, which consume less power but do not allow a coverage rate as high as the SAS installed on towed fish to be achieved. Typically, the coverage rate ratio between the two solutions for a set antenna acoustic range is about 2.

Moreover, because of the low data rate of underwater acoustic communications, an autonomous underwater vehicle cannot transmit in real-time its acoustic data to an operator and hence, to ensure a satisfactory detection of underwater objects, it is necessary to endow the underwater vehicle with an artificial intelligence allowing it to detect objects autonomously, or wait to the end of the mission to allow an operator to analyze the acoustic data stored on board the underwater vehicle.

Because of their speed of operation and real-time processing capacity, SAS installed on a towed fish are generally judged to be of higher performance than a SAS installed on an autonomous underwater vehicle. However, the installation of a SAS on a towed fish requires a device for towing the fish comprising a ship and a system comprising a winch and a cable for putting the sonar in and retrieving it from the water. The bulk and power of this system for putting in and retrieving from the water increases as the depth that it is sought to image increases because the need for a longer cable means that the size of the winch and the power of the surface vehicle required to overcome the drag of the cable must increase. This constraint thus limits the depth of operation of towed SAS sonar, above all if they must be towed by surface drones of modest size. Typically, towed imaging SAS sonar for mine warfare operate at depths smaller than 100 m, whereas an underwater drone is preferred for larger depths, typically up to 300 m or more.

SUMMARY OF THE INVENTION

One aim of the invention is to allow a user to perform sonar imaging missions of high coverage rate and sonar imaging missions at large depth without acquiring two different vehicles.

To this end, one subject of the invention is an underwater vehicle comprising a propeller able to propel the underwater vehicle, the underwater vehicle comprising a synthetic aperture sonar comprising a set of at least one physical antenna for receiving acoustic waves, the underwater vehicle comprising a connector able to mechanically couple removably a cable to the underwater vehicle so as to allow the underwater vehicle to be towed by a surface vehicle. According to the invention, the physical receiving antenna comprises a plurality of acoustic sensors, the underwater vehicle comprising an electrical network able to convey electrical power to the receiving antenna, the electrical network being configured so as to have a plurality of states in which it is able to convey electrical power to different sets of acoustic sensors containing different respective numbers of acoustic sensors.

Advantageously, the invention comprises at least one of the features below implemented alone or in combination:

the underwater vehicle is able to be used as an autonomous underwater vehicle when it is mechanically decoupled from the cable and to be used as a non-autonomous underwater vehicle when it is mechanically coupled to the surface vehicle via the cable;

the electrical network is able to be in at least one first state and in at least one second state in which the electrical network conveys or is able to convey electrical power to a number of acoustic sensors lower than the number of acoustic sensors powered in each first state;

the electrical network of the receiving antenna is configured to convey electrical power to a higher number of sensors when it is mechanically coupled to the cable than when it is not mechanically coupled to the cable;

the electrical network is configured to be in one of said at least one first states when it is mechanically coupled to the cable and in one of said at least one second states when it is mechanically decoupled from the cable;

the antenna for receiving acoustic waves comprises a plurality of arrays of acoustic sensors aligned along the same axis;

the electrical network is able to be in a first state in which it conveys or is able to convey power simultaneously to all the acoustic sensors of the physical receiving antenna and in a second state in which it conveys or is able to convey power to only some of the linear arrays of the antenna;

the physical receiving antenna comprises two linear arrays of acoustic sensors, each linear array comprising a set of acoustic sensors, the acoustic sensors of the set being adjacent, the acoustic sensors of two sets being different;

the physical receiving antenna comprises two linear arrays of acoustic sensors comprising a first set of acoustic sensors and a second set of acoustic sensors different from the acoustic sensors of the first set, respectively, each pair of adjacent sensors of the physical receiving antenna comprising an acoustic sensor of the first set and an acoustic sensor of the second set;

the set of at least one physical receiving antenna comprises two parallel physical antennas for receiving acoustic waves each comprising a plurality of arrays of acoustic sensors aligned along the same alignment axis, the respective alignment axes of the two antennas being substantially parallel to and distant from each other;

the electrical network is able to be in a first state in which it powers or is able to simultaneously power all the acoustic sensors of the two receiving antennas and in a second state in which it powers or is able to power only one linear array of acoustic sensors of each of the parallel receiving antennas;

the power network has a first state in which it powers or is able to simultaneously power all the acoustic sensors of the two receiving antennas and a second state in which it powers or is able to power all the acoustic sensors of a single of the two physical receiving antennas;

the connector ensures an electrical connection between the electrical network and the cable when the cable is mechanically coupled to the connector, the electrical network being configured to electrically power the receiving antenna via the cable when the electrical network is in the first state;

the connector ensures a connection communicationwise between the cable and a communication network of the underwater vehicle when the cable is mechanically coupled to the connector, the communication network being configured to link the receiving antenna communicationwise to the cable so as to allow measurements carried out by the physical receiving antenna to be transmitted to the cable when the power network is in the first state; the vehicle comprises processing means comprising a set of at least one processor able to process measurements delivered by the physical receiving antenna, the processing means being configured so that a processor of the set of at least one processor processes measurements delivered by the physical receiving antenna solely when the underwater vehicle is mechanically connected to the cable, i.e. mechanically coupled to the cable.

The invention also relates to a method for controlling an electrical network of an underwater vehicle of the invention, said method comprising the following steps:

powering a first set of acoustic sensors, containing a first number of acoustic sensors, when the vehicle is mechanically connected, i.e. coupled, to the cable, powering a second set of sensors, containing a second number of acoustic sensors lower than the first number, when the vehicle is mechanically connected to the cable.

powering a first set of acoustic sensors, containing a first number of acoustic sensors, when the vehicle is mechanically connected, i.e. coupled, to the cable, powering a second set of sensors, containing a second number of acoustic sensors lower than the first number, when the vehicle is mechanically connected to the cable.

Advantageously, the method comprises the following steps:

simultaneously powering all the acoustic sensors of the two receiving antennas when the vehicle is mechanically connected to the cable, powering only a subset of acoustic sensors of each of the parallel receiving antennas, when the vehicle is mechanically decoupled from the cable.

The invention also relates to a method for controlling a communication network of an underwater vehicle according to the invention, comprising the following steps:

linking a first set of sensors, containing a first number of acoustic sensors, communicationwise with the cable when the vehicle is mechanically coupled to the cable, linking a second set of acoustic sensors, containing a second number of acoustic sensors lower than the first number, communicationwise with a memory of the vehicle when the vehicle is mechanically decoupled from the cable.

linking a first set of sensors, containing a first number of acoustic sensors, communicationwise with the cable when the vehicle is mechanically coupled to the cable, linking a second set of acoustic sensors, containing a second number of acoustic sensors lower than the first number, communicationwise with a memory of the vehicle when the vehicle is mechanically decoupled from the cable.

Advantageously, the method comprises the following steps:

transmitting measurements generated by the first set of sensors to the cable, when the vehicle is mechanically coupled to the cable, transmitting measurements generated by the second set of sensors to the memory, when the vehicle is mechanically decoupled from the cable.

BRIEF DESCRIPTION OF THE DRAWINGS

The invention will be better understood on studying a few embodiments described by way of completely nonlimiting example, and illustrated by the appended drawings in which, from one figure to the next, the same elements have been designated with the same references.

DETAILED DESCRIPTION

Figure 1:
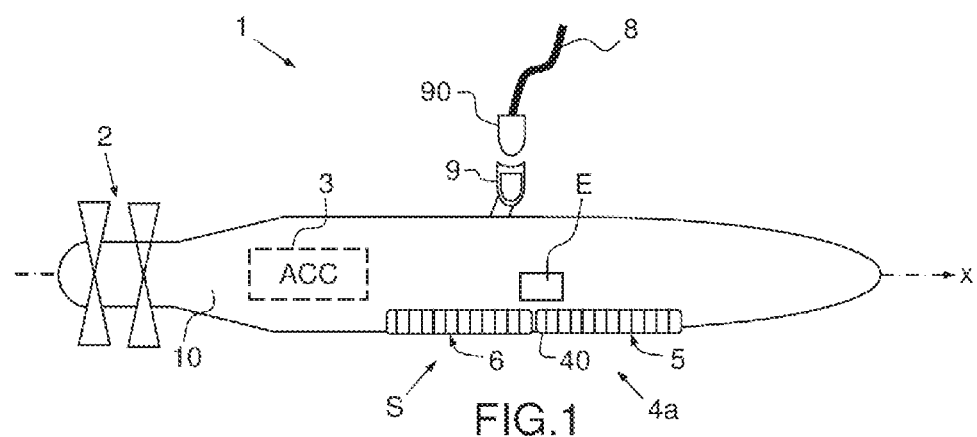
FIG. 1 schematically shows a side view of an underwater vehicle according to the invention.

As may be seen in FIG. 1, the underwater vehicle 1 comprises a propeller 2 mounted on a body 10 of the underwater vehicle and that serves to propel the underwater vehicle 1. The underwater vehicle also comprises a synthetic aperture sonar (SAS) S.

The underwater vehicle 1 is intended to move mainly along an axis x called the main axis of movement of the vehicle 1. This axis is the longitudinal axis of the body 10 of the vehicle 1.

The underwater vehicle 1 comprises an accumulator of electrical energy 3 able to electrically power the propeller 2 and the SAS, S.

The sonar S comprises a transmitting device E comprising one or more transmitting antennas able to transmit acoustic pulses toward an observed zone and at least one physical receiving antenna 4a allowing backscattered signals generated by the pulses transmitted by at least one transmitting antenna E to be measured. The transmitting antenna may be a different piece of equipment from the receiving antennas or indeed comprise electroacoustic transducers of at least one receiving antenna.

Each physical receiving antenna comprises a plurality of acoustic sensors 40. The acoustic sensors 40 of a given antenna are aligned along a given axis. Each acoustic sensor 40 is an electroacoustic transducer or hydrophone.

Figure 2:
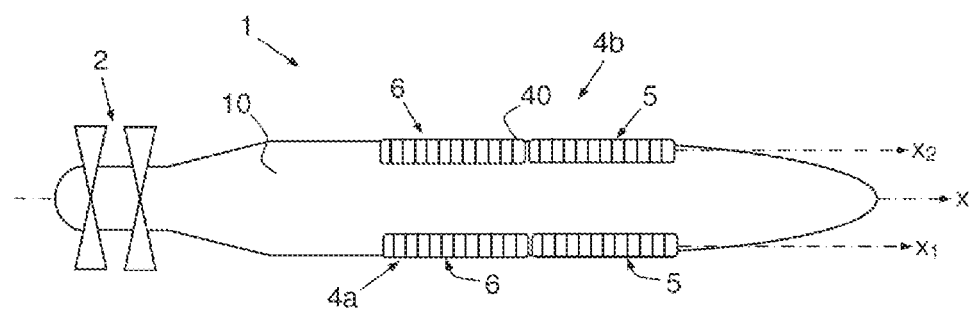
FIG. 2 schematically shows a view from below of the same vehicle.

In the particular embodiment of FIG. 2, the sonar comprises two physical receiving antennas 4a, 4b.

The receiving antennas 4a, 4b are substantially parallel to each other; they extend linearly substantially parallel to the axis x. Each antenna 4a, 4b extends linearly along an alignment axis x1 or x2 and the alignment axes of the two antennas are spaced apart in a direction perpendicular to the axis x. The alignment axis x1 or x2 of an antenna is the axis along which the acoustic sensors of the antenna are aligned.

In the embodiment of the figures, one of the antennas is placed port side and the other starboard side with respect to the body 10.

In the nonlimiting example of the figures, each of the linear physical antennas comprises a pair of linear arrays 5 and 6 of acoustic sensors. Each linear array 5 and 6 of acoustic sensors comprises a plurality of acoustic sensors 40 aligned along the same axis. The arrays 5 and 6 may comprise the same number of acoustic sensors or different numbers of acoustic sensors. The sensors 40 of all the linear arrays of a given antenna are aligned along the same axis x1 or x2.

As a variant, the SAS comprises a single physical receiving antenna or more than two physical receiving antennas.

The underwater vehicle 1 comprises a mechanical connector 9 allowing the underwater vehicle 1 to be mechanically and electrically coupled removably to a cable 8 so as to allow the underwater vehicle 1 to be mechanically linked to a surface vehicle 100 temporarily.

The connector 9 is for example a male or female connector intended to interact with another female or male connector 90 with which one end of the cable is connected so that, when the male connector and the female connector interact, the vehicle is mechanically linked to the cable, this allowing it to be mechanically linked to the surface vehicle, respectively.

Figure 3A:
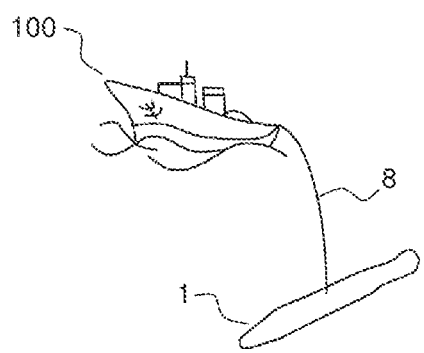
FIG. 3a schematically shows the underwater vehicle mechanically linked to a surface vehicle by a cable.
Figure 3B:
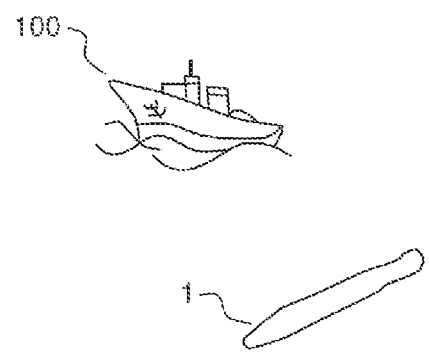
FIG. 3b shows the same underwater vehicle disconnected from the surface vehicle.

In FIG. 3a, the underwater vehicle 1 is mechanically coupled to a surface vehicle 100 via the cable 8. In FIG. 3b, the underwater vehicle 1 is autonomous, i.e. separated from the cable 8.

Figure 4:
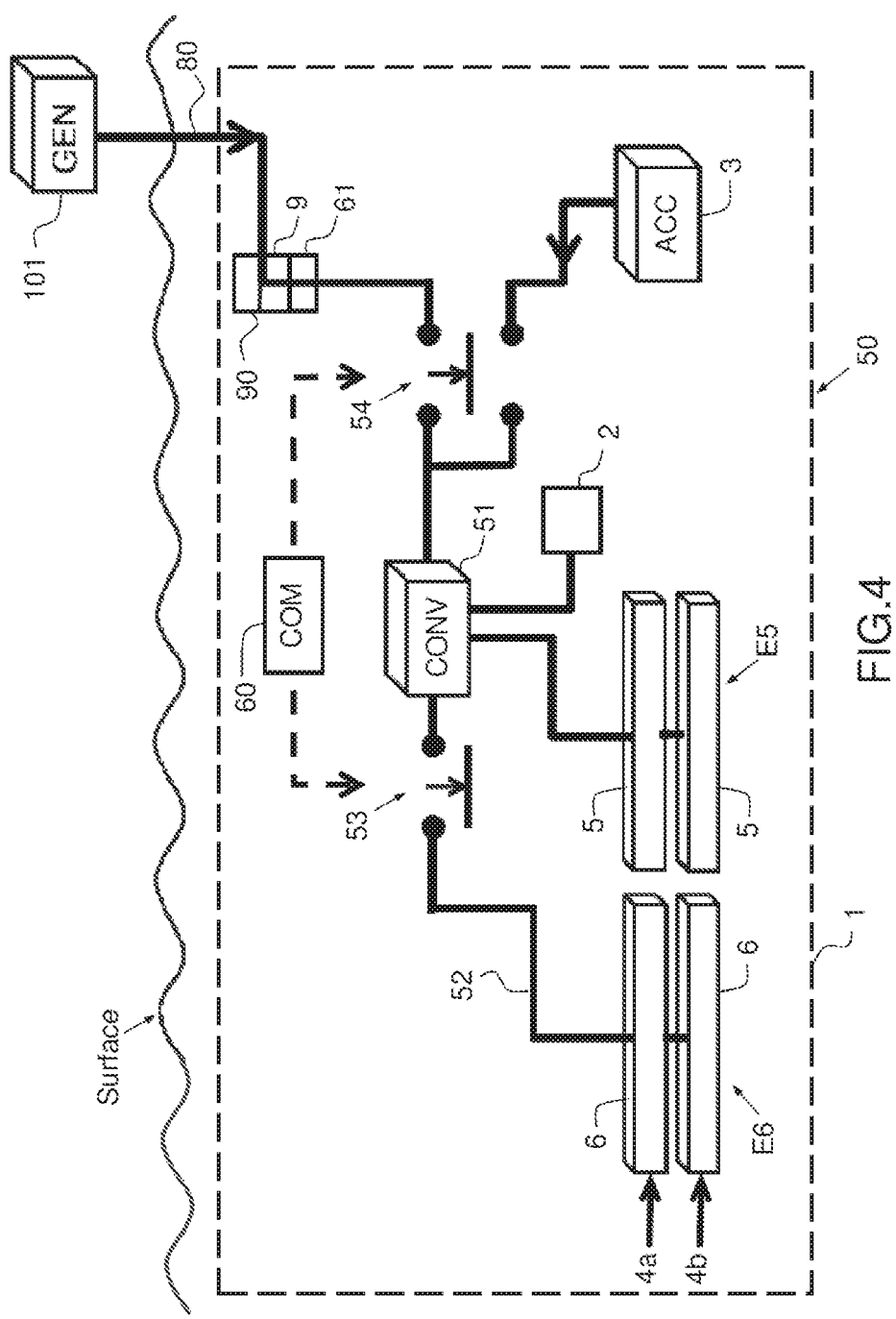
FIG. 4 schematically shows one portion of an electrical network of the underwater vehicle.

FIG. 4 schematically shows an example of one portion of an electrical network 50 of the vehicle. This electrical network 50 allows electrical power to be conveyed to all of at least one acoustic receiving antenna 4a, 4b.

According to the invention, the electrical network 50 is able to be in a plurality of states in which it conveys or is able to convey electrical power to different sets of acoustic sensors containing different numbers of acoustic sensors. In other words, the number of acoustic sensors powered, i.e. activated, is different in the two states of the electrical network 50. These numbers are non-zero.

In the nonlimiting example of FIG. 4, the electrical network 50 comprises a power converter CONV, 51 electrically linked permanently to a first set E5 of linear arrays comprising the arrays 5 of the two receiving antennas 4a, 4b. The second set E6 of linear arrays comprising the arrays 6 of the receiving antennas 4a, 4b is electrically connected to the power converter 51 by a power line 52 comprising a switch 53. The switch 53 is able to be either in a first state, a closed state, in which it electrically connects the second set E6 of linear arrays to the converter 51, or in a second state in which it opens the power line 52 so that the second set E6 of linear arrays is no longer electrically connected to the converter 51. When the switch 53 is in the first state, all the sensors of the second set E6 of linear arrays 6 are activated since they are electrically powered by the converter 51, they then take measurements of backscattered signals. When the switch 53 is in the second state, the sensors of the second set E6 of linear arrays 6 are deactivated since it is not electrically connected to the converter 51 and therefore not electrically powered by the converter 51. The acoustic sensors of the first set E5 of linear arrays 5 are for their part permanently connected to the converter 51.

In other words, in the nonlimiting example of the figures, the electrical network 50 is able to be in a plurality of states in which it is able to convey electrical power to various sets of acoustic sensors (E5+E6 in the first state and E5 in the second state) comprising different numbers of acoustic sensors (E5+E6 comprises more sensors than E5).

The invention therefore makes it possible to provide a single system capable of combining the advantages of a SAS installed on a towed fish and a SAS installed on an autonomous vehicle and to offer the user greater operational flexibility while allowing him not to have to acquire two different systems. Specifically, the capacity of the vehicle according to the invention to receive acoustic waves may be modulated, this allowing the capacity of the vehicle to receive acoustic waves to be tailored to its state, i.e. to whether it is being towed by a surface vehicle or used in autonomous mode, and therefore to its capacities in terms of speed and/or power, by judiciously modifying the state of the electrical network depending on the state of the vehicle. The vehicle, which is able to acquire measurements with a variable number of sensors, may acquire, using more sensors, images of the same resolution at a higher speed and therefore obtain a higher coverage rate.

Thus, a given underwater vehicle 1 is able, when it is mechanically linked to a surface vehicle 100, to explore the seabed with a high coverage rate by activating the entirety of the high-speed antenna, and to do so for a long time, if it is powered by the surface vehicle 100. It is also capable, when it is detached from the surface vehicle, to take measurements at large depth with a lower coverage rate or a lower resolution by only activating one portion of the receiving antenna, to limit its power consumption.

Since the underwater vehicle 1 according to the invention is equipped with a propeller 2, it allows surface vessels of limited size to be used since it is not necessary to make provision on board these surface vessels for means for placing it in the water or retrieving it.

Advantageously, in order to best capitalize on the ability to power different numbers of sensors, the electrical network 50 is configured to convey power to a number of acoustic sensors of the antennas that is higher when it is mechanically coupled to the cable 8 than when it is separated from the cable 8.

To this end, the vehicle 1 of the nonlimiting embodiment of FIG. 4 comprises a control unit COM, 60, configured to place the switch 53 in the first state when the underwater vehicle 1 is mechanically linked to the cable 8 and to place the switch 53 in the second state when the underwater vehicle 1 is no longer mechanically coupled to the cable 8. The underwater vehicle 1 also comprises a sensor 61 allowing it to be detected whether the vehicle is mechanically coupled to the cable 8 and to inform the control unit 60 thereof.

Advantageously, the set of at least one first state comprises a first state, referred to as the optimal state, in which the electrical network 50 conveys acoustic power to all the acoustic sensors of the receiving antennas of the sonar.

This is the case of the particular embodiment of FIG. 4, the electrical network 50 is able to be in a first state in which the electrical network 50 is able to convey electrical power simultaneously to all the acoustic sensors of the two antennas 4a, 4b (i.e. all the sensors of the sets E5 and E6). The switch 53 is then in the closed state. The electrical network 50 is able to be in a second state in which it is able to convey electrical power simultaneously solely to the acoustic sensors of the first set E5, i.e. to the sensors of the linear arrays 5 of the two antennas 4a and 4b.

Advantageously, the acoustic sensors powered when the underwater vehicle 1 is disconnected from the surface vehicle 100, and belonging to a given antenna, are adjacent to one another. They are not separated by sensors that are not powered. In other words, the linear arrays 5 and 6 of a given antenna 4a or 4b are adjacent along the axis of the antenna and the acoustic sensors of a given array 5 or 6 of a given antenna 4a or 4b are acoustic sensors that are adjacent to one another.

In another embodiment, when the underwater vehicle is disconnected from the surface vehicle, a single of the two sensors of each pair of adjacent sensors of a given antenna is electrically powered. Advantageously, each of the antennas is powered in this way. In other words, one sensor in two of each antenna is powered. In other words, when the axis of the antenna is moved along, the sensors of a given antenna alternately belong to a first array of sensors and to a second array of sensors. A single of the two arrays is powered when the underwater vehicle is disconnected, i.e. decoupled, from the cable. Each acoustic sensor of an array of an antenna 4a is adjacent to an acoustic sensor of another array of the same antenna. In this case, the resolution of the SAS is two times lower than when all the sensors are powered.

In the nonlimiting embodiment of the figures, the first arrays 5 of the two antennas 4a and 4b have substantially the same length, i.e. the same number of acoustic sensors are substantially symmetric to each other with respect to a plane passing through the axis x. Thus, it is as though, when the underwater vehicle is operating in autonomous mode, the receiving antennas used are shorter than when the vehicle is mechanically connected to the surface vehicle.

Advantageously, the mechanical connector 9 is also an electrical connector that ensures an electrical connection between the network 50 and the cable 8, when the cable 8 is mechanically and electrically coupled to the underwater vehicle 1. In other words, the mechanical connector 9 ensures an electrical connection between the electrical network 50 of the vehicle and a power line 80 of the cable 8, when the cable 8 is mechanically coupled to the underwater vehicle 1. The power line 80 of the cable 8 allows the electrical network 50 to be electrically connected to an electrical power source GEN, 101, which is located onboard the surface vessel 100. In other words, the cable allows the electrical network 50 to be electrically powered from the surface vessel via the cable 8.

Advantageously, the electrical network 50 is configured to electrically power the sonar and in particular the receiving antennas 4a, 4b from the cable 8, for example by means of the source GEN 101, when the network 50 is electrically connected to the cable 8, and to electrically power the receiving antennas 8 from the accumulator of electrical energy ACC, 3 of the vehicle when the network 50 is not electrically connected to the cable, i.e. when the underwater vehicle 1 is separated from the cable 8.

To this end, the network 50 of FIG. 4 comprises a switch 54 able to be alternately in a first state in which it electrically connects the power converter 51 to the connector 9 and therefore to the cable 8, allowing the antenna to be powered solely from the cable 8, and in a second state in which it links the converter 51 to the accumulator 3 of the vehicle so that the converter 51 is electrically powered via the accumulator 3. The power network 50 is then configured so that the switch 54 is in the first state when the vehicle 1 is mechanically and electrically coupled cable 8 and to put the switch 54 in the second state when the vehicle 1 is separated from the cable 8. This is achieved via the control unit COM, 60 of the underwater vehicle 1. Therefore, when the vehicle 1 is mechanically coupled to the cable 8, all the acoustic sensors are electrically powered, i.e. they are active and they take measurements of backscattered acoustic signals. These linear arrays are electrically powered by a source located on-board the surface vehicle 100. When the underwater vehicle 1 is separated from the cable 8, only the acoustic sensors of the first linear arrays 5 are powered and they are powered by the accumulator of electrical energy 3 of the underwater vehicle 1. This configuration of the power network 50 is the most suited to the capacity in terms of energy of the underwater vehicle and normally to its capacity in terms of speed, the surface vehicle conventionally having a larger capacity in terms of speed than the underwater vehicle 1.

In the embodiment of FIG. 4, the converter 51 is powered directly by the source 101 via the cable 8 when the cable 8 is linked to the underwater vehicle 1. As a variant, the source 101 electrically powers the accumulator 3 via the cable and the accumulator 3 electrically powers the converter 51. In other words, the sensors of the antennas are powered via the cable by means of the accumulator 3.

Advantageously, as shown in FIG. 4, the network 50 is configured so as to be able to, or is configured to, electrically power the propeller 2 via the cable 8 when the cable 8 is electrically coupled to the network 50. The activation of a higher number of acoustic sensors, when the underwater vehicle 1 is coupled to the cable 8, is then the configuration most suited to the available electrical power.

Advantageously, the network 50 is configured so as to electrically power the propeller 2 by means of the accumulator 3 when the vehicle 1 is separated from the cable 8.

Figure 5:
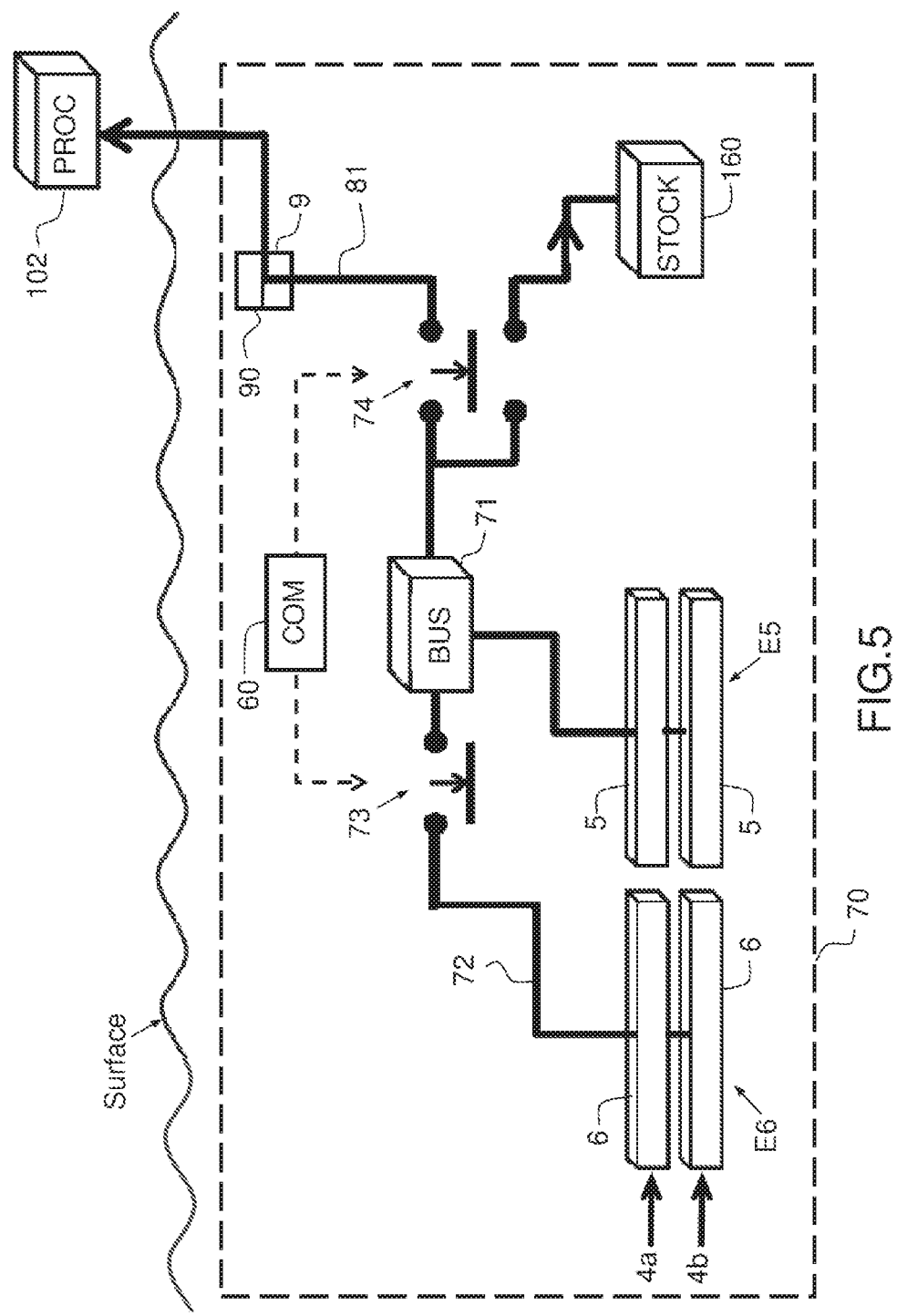
FIG. 5 schematically shows one portion of an example of a communication network of the underwater vehicle.

As shown in FIG. 5, which shows one portion of a communication network 70 of the underwater vehicle 1, the underwater vehicle 1 comprises a memory STOCK, 160 able to store acoustic measurements obtained by the acoustic sensors of each physical acoustic receiving antenna 4a, 4b.

Advantageously, the connector 9 ensures a connection communicationwise between a data transmission line 81 of the cable 8 and the communication network 70 of the vehicle when the cable 8 is mechanically coupled to the connector 9. The communication network 70 is able to link communicationwise each receiving antenna 4a, 4b to the connector 9 so as to connect each receiving antenna 4a, 4b communicationwise with the surface vehicle 100.

The surface vehicle 100 for example comprises a processor PROC, 102 able to process measurements obtained by means of the sensors of each receiving antenna 4a, 4b.

Advantageously, the communication network 70 is configured to link each receiving antenna 4a, 4b communicationwise with the cable 8 so as to transmit the measurements taken by the active sensors of each physical receiving antenna to the cable 8 when the underwater vehicle 1 is mechanically connected to the cable 8 and in order to link each receiving antenna 4a, 4b communicationwise with the memory 160, optionally via a processor, so as to transmit the measurements taken by the active sensors of each physical receiving antenna to the memory 160, optionally via a processor, when the underwater vehicle 1 is separated from the cable 8. This configuration is, for example, realized by the control unit 60. This allows processing of the measurements to be carried out in real-time when the underwater vehicle is linked in real-time and thus to avoid having to wait to the end of the mission to process these measurements. The processor may process the measurements delivered by the physical antennas before transmission to the memory.

To this end, in the nonlimiting example of FIG. 5, the data-transmission network comprises a data-transmission bus 71 to which the first set E5 of linear arrays is permanently linked communicationwise. The second set E6 of linear arrays is linked communicationwise to the data-transmission bus by a data-transmission line 72 comprising a switch 73. The switch 73 is able to be in a first state, a closed state, in which it links communicationwise the second set E6 of linear arrays 6 to the communication bus 71 and in a second state in which it disconnects the second set E6 of linear arrays 6 from the communication bus 71. When the switch 73 is in the first state, the acoustic sensors of the two sets E5 and E6 are able to communicate with the communication bus 71 and when the switch 73 is in the second state, only the acoustic sensors of the first set E5 are able to communicate with the communication bus 71.

The communication network 70 also comprises a switch 74 able to be alternately in a first state in which it links communicationwise the communication bus 71 to the data-transmission line 81 of the cable 8, allowing communication between the communication bus 81 and a remote piece of equipment located on board the surface vessel, the processor 102 for example, and in a second state in which the switch 74 links communicationwise the communication bus 71 to a piece of equipment of the underwater vehicle 1, the memory 160 for example.

Advantageously, the communication network 70 is configured to link the two sets E5 and E6 of linear arrays 5, 6 communicationwise with the communication bus 71 when the vehicle 1 is mechanically linked to the cable 8 and to solely link the first set E5 of linear arrays 5 communicationwise with the communication bus 71 when the vehicle is separated from the cable 8. In other words, only the sensors of the first set E5 of linear arrays 5 are able to transmit data to the communication bus 71, or vice versa, when the vehicle 1 is separated from the cable 8. The communication network 70 is also advantageously configured so that the sensors of the two sets E5 and E6 of linear arrays 5, 6 are able to transmit their measurements to the communication bus 71, or vice versa, when the vehicle 1 is mechanically linked to the cable 8.

In the nonlimiting example of the figures, this means that the communication network 70 is configured so that the switch 73 and the switch 74 of the communication network are each in their first state when the underwater vehicle 1 is mechanically linked to the cable 8. The acoustic sensors of the two sets E5 and E6 of linear arrays are then able to communicate with the processor 8 and are advantageously configured to transmit thereto their measurements so that the memory can store these measurements.

The communication network 70 is advantageously configured so that the switch 73 and the switch 74 of the communication network are each in their second state when the power network is separated from the cable 8. Only the sensors of the first set E5 of linear arrays 5 are then able to communicate with the memory 160 and especially to transmit thereto measurements so that the memory 160 can store these measurements.

Figure 6:
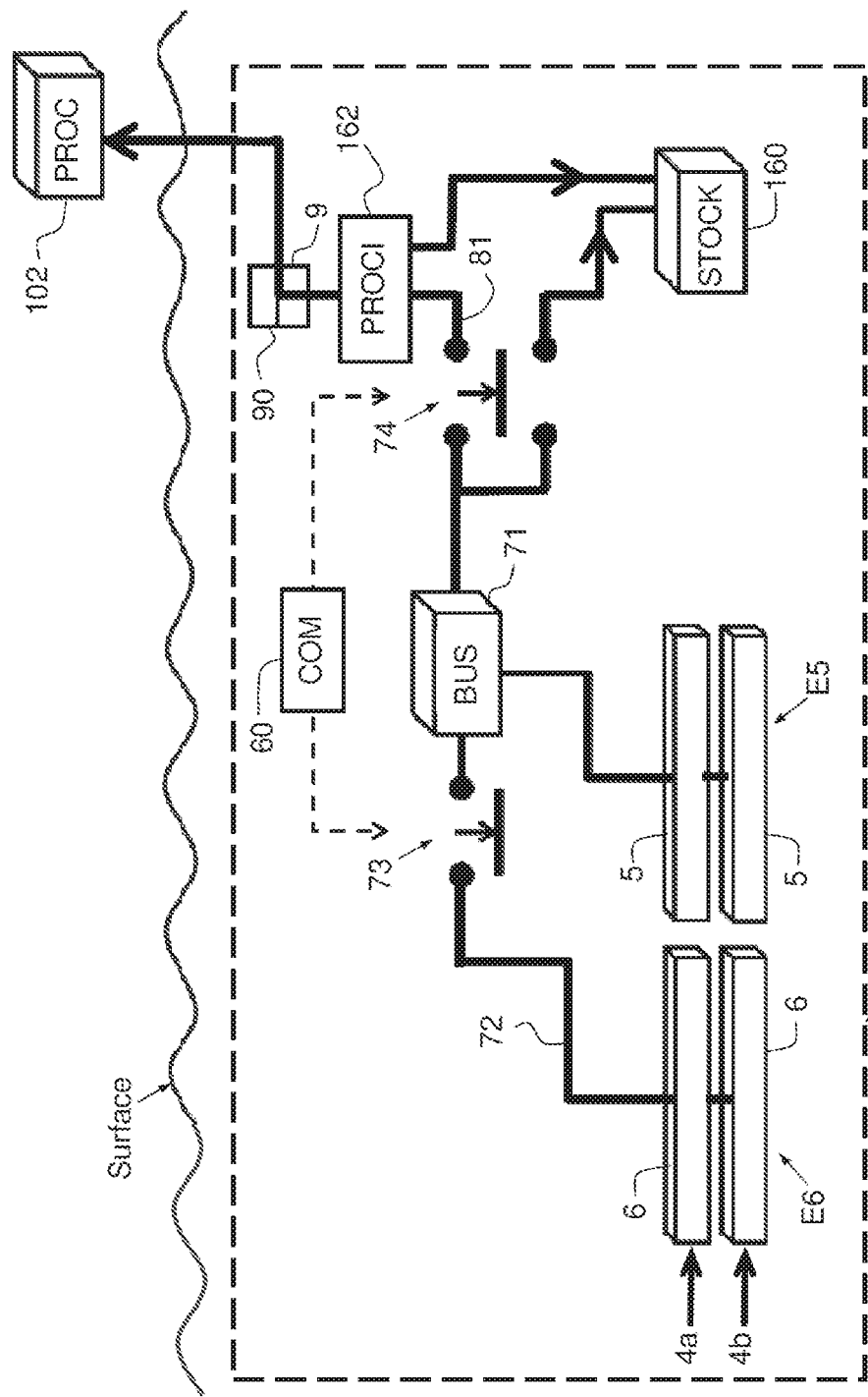
FIG. 6 schematically shows one portion of another example of a communication network of the underwater vehicle.

FIG. 6 differs from FIG. 5 in that the communication network 170 is configured to link a processor PROCI 162 of the underwater vehicle 1 communicationwise with the physical receiving antennas, solely when the switch 73 is in the first state.

Advantageously, the underwater vehicle comprises processing means comprising a set of at least one processor able to process measurements delivered the physical receiving antenna. Advantageously, the processing means are configured so that a processor PROCI2 of the set of at least one processor processes measurements delivered by the acoustic sensors of the physical receiving antennas solely when the underwater vehicle is mechanically connected to the cable. The processor is for example able to implement a method for forming synthetic aperture beams and/or a pulse-compressing method and/or a self-calibration method. The processing means for example comprise the control unit 60, which is configured to control the processor PROCI2 so as to activate the processor so that it processes the data generated by the acoustic sensors of the antennas solely when the underwater vehicle is mechanically linked to the cable. This allows the data rate, which is costly in the case of the measurements of a SAS, between the underwater vehicle and the surface vehicle to be decreased. This also allows a more standard interface to be used between the underwater vehicle and the surface vehicle. This allows the installation of a processor in the surface vehicle to be avoided, this allowing the underwater vehicle to be towed by means of multiple non-dedicated surface vehicles.

The data generated by the processing of the measurements by the processor PROCI, 162 may be stored in the memory STOCK, 160.

The processing means may comprise at least one other processor interposed between the memory 160 and the switch 74 so as to preprocess the acoustic measurements.

In the embodiment of the figures, the electrical network 50 is able to be in a first state in which it electrically powers each sensor of the antennas 4a, 4b and in a second state in which it electrically powers a subset of sensors of each antenna 4a, 4b.

As a variant, in the second state, the electrical network 50 powers all the sensors of a single of the receiving antennas. This embodiment allows energy to be saved. As a variant, in the second state, the electrical network solely powers some of the sensors of a single of the antennas.

As a variant, the electrical network is able to be in a plurality of first states in which it powers different numbers of sensors when the vehicle is mechanically linked to the cable. This allows, for example, more sensors to be powered when the speed of the vehicle 1 is higher.

In the embodiment of FIG. 4, the converter 51 is unable to power the sensors of the second set of sensor array 6 when the switch is in the first state. As a variant, the second set E6 of sensor array 6 is electrically linked permanently to the converter 51 so that their sensors can be electrically powered. In contrast, the control unit is configured to control the converter so as to power or not power said sensors. For example, the control unit 60 is configured to control the converter so as to power the sensors of the sensor array 6 only when the vehicle 1 is linked to the cable 8. In other words, the network 50 is able to power all the sensors but it is configured to power only some of the sensors. In other words, the function of the switch 53 is performed by the control unit. The functions of the switch 73 and of the switches 54 and 74 may also, as a variant, be performed by the control unit or by a set of control units.

The invention also relates to a method for controlling the underwater vehicle 1 or the electrical network 50 according to the invention, comprising the following steps:

simultaneously powering a first set of sensors containing a first number of acoustic sensors when the vehicle is mechanically connected, i.e. coupled, to the cable, simultaneously powering a second set of sensors containing a second number of acoustic sensors, lower than the first number, when the vehicle is not mechanically connected to the cable.

Advantageously, the method comprises the following steps:

simultaneously powering all the acoustic sensors of the two antennas when the vehicle is mechanically connected to the cable, simultaneously powering only the sensors of a first linear array of acoustic sensors of each of the parallel linear antennas, when the vehicle is not mechanically connected to the cable.

In other words, the first set of sensors corresponds to all of the acoustic sensors of the antenna, i.e. of the two elementary antennas. The second set of sensors corresponds to a first linear array of acoustic sensors of each of the elementary antennas.

The invention also relates to a method for controlling the underwater vehicle or the communication network 70 according to the invention, comprising the following steps:

linking a first set of sensors, containing a first number of acoustic sensors, communicationwise with the cable when the vehicle is mechanically connected to the cable, linking a second set of acoustic sensors, containing a second number of acoustic sensors, lower than the first number, communicationwise with the memory when the vehicle is not mechanically connected to the cable.

Advantageously, the method comprises the following steps:

transmitting measurements generated by the first set of sensors to the cable, when the vehicle is mechanically connected to the cable, transmitting measurements generated by the second set of sensors to the memory, when the vehicle is mechanically disconnected from the cable.

Advantageously, the first set of sensors corresponds to all of the acoustic sensors of the antenna, i.e. of the two elementary antennas. The second set of sensors corresponds to a first linear array of acoustic sensors of each of the elementary antennas.

The invention also relates to a general control method comprising the two preceding control methods.

Advantageously, the vehicle moves at a higher speed, substantially parallel to the axes of the antennas, during the step in which the first number is sensors is simultaneously powered than when the second number of sensors is simultaneously powered. In other words, the vehicle advantageously moves at a higher speed, substantially parallel to the axes of the antennas, during the step in which all of the acoustic sensors are simultaneously powered than during the step in which solely the sensors of the first array are simultaneously powered.

The method advantageously comprises an intermediate step of simultaneously powering an intermediate set of acoustic sensors containing an intermediate number of sensors comprised between the first number and the second number when the vehicle is mechanically connected, i.e. coupled, to the cable, the speed of the underwater vehicle being lower, parallel to the axis x, during the step in which the intermediate number of sensors is simultaneously powered than during the step in which all the sensors are simultaneously powered.

The invention also relates to a method for acquiring images by means of the SAS in which, during the step in which the first number of acoustic sensors is powered, the underwater vehicle is linked to a surface vehicle.

Each control means or unit may comprise one or more dedicated electronic circuits or a general use circuit. Each electronic circuit may comprise a reprogrammable computational machine (a processor or a microcontroller for example) and/or a computer that executes a program comprising a sequence of instructions and/or a dedicated computational machine (for example a set of logic gates such as an FPGA, a DSP or an ASIC or any other hardware module).

As seen above, the underwater vehicle is able to be used as an autonomous underwater vehicle.

The underwater vehicle may be used as an ROV, i.e. as a remote operated vehicle. This vehicle is linked to a surface vehicle by a cable. The surface vehicle electrically powers the propeller of the underwater vehicle and each receiving antenna and preferably the entire sonar via the cable. The underwater vehicle is propelled by its own propeller.

Advantageously, the RAV transmits the sonar data to the surface vehicle by the cable in order to allow real-time processing on board the surface vessel and/or transmission by radio to a land-based processing center.

In the prior art, a vehicle intended to be used as an ROV is conventionally less powerful than the surface vessel; the operating speed is then slow (a few knots) and the receiving antenna of the SAS by its nature shorter (about 1 m) than when it is installed on a towed fish, this limiting the imaging coverage rate. However, the operating speed may be higher than when the underwater vehicle is disconnected from the surface vehicle because the propeller and the receiving antennas are electrically powered via the cable. The invention therefore allows the number of sensors powered to be matched to the speed that the vehicle is able to reach when it is used as an ROV.

In the present patent application, when an array of sensors is powered, all the sensors of the array are powered.

The invention claimed is:

1. A method for controlling an electrical network of an underwater vehicle, said method comprising:
    powering a first set of acoustic sensors, containing a first number of acoustic sensors, when the underwater vehicle is mechanically coupled to a cable; and
    powering a second set of sensors, containing a second number of acoustic sensors lower than the first number, when the underwater vehicle is mechanically decoupled from the cable, wherein the underwater vehicle comprises a propeller able to propel the underwater vehicle, the underwater vehicle comprising a synthetic aperture sonar comprising a set of at least one physical antenna for receiving acoustic waves, the underwater vehicle comprising a connector able to mechanically couple removably the cable to the underwater vehicle so as to allow the underwater vehicle to be towed by a surface vehicle, wherein the physical receiving antenna comprises a plurality of acoustic sensors, the underwater vehicle comprising an electrical network able to convey electrical power to the receiving antenna, the electrical network being configured so as to have a plurality of states wherein it is able to convey electrical power to different sets of acoustic sensors containing different respective numbers of acoustic sensors.

2. The method as claimed in claim 1, wherein the underwater vehicle is able to be used as an autonomous underwater vehicle when it is mechanically decoupled from the cable and to be used as a non-autonomous underwater vehicle when it is mechanically coupled to the surface vehicle via the cable.

3. The method as claimed in claim 1, wherein the electrical network is able to be in at least one first state and in at least one second state wherein the electrical network is able to convey electrical power to a number of acoustic sensors lower than the number of acoustic sensors powered in each first state.

4. The method as claimed in claim 3, wherein the electrical network of the receiving antenna is configured to be in one of said at least one first states when it is mechanically coupled to the cable and in one of said at least one second states when it is mechanically decoupled from the cable.

5. The method as claimed in claim 1, wherein the antenna for receiving acoustic waves comprises a plurality of arrays of acoustic sensors aligned along the same axis.

6. The method as claimed in claim 5, wherein the electrical network is able to be in a first state wherein it is able to convey power simultaneously to all the acoustic sensors of the physical receiving antenna and in a second state wherein it is able to convey power to only some of the linear arrays of the antenna.

7. The method as claimed in claim 6, wherein the physical receiving antenna comprises two linear arrays of acoustic sensors, each linear array comprising a set of acoustic sensors, the acoustic sensors of the set being adjacent, the acoustic sensors of two sets being different.

8. The method as claimed in claim 6, wherein the physical receiving antenna comprises two linear arrays of acoustic sensors comprising a first set of acoustic sensors and a second set of acoustic sensors different from the acoustic sensors of the first set, respectively, each pair of adjacent sensors of the physical receiving antenna comprising an acoustic sensor of the first set and an acoustic sensor of the second set.

9. The method as claimed in claim 5, wherein the set of at least one physical receiving antenna comprises two parallel physical antennas for receiving acoustic waves each comprising a plurality of arrays of acoustic sensors aligned along the same alignment axis, the respective alignment axes of the two antennas being substantially parallel to and distant from each other.

10. The method as claimed in claim 7, wherein the electrical network is able to be in a first state wherein it is able to simultaneously power all the acoustic sensors of the two receiving antennas and in a second state wherein it is able to power only one linear array of acoustic sensors of each of the parallel receiving antennas.

11. The method as claimed in claim 8, wherein the power network has a first state wherein it is able to simultaneously power all the acoustic sensors of the two receiving antennas and a second state wherein it is able to power all the acoustic sensors of a single of the two physical receiving antennas.

12. The method as claimed in claim 3, wherein the connector ensures an electrical connection between the electrical network and the cable when the cable is mechanically coupled to the connector, the electrical network being configured to electrically power the receiving antenna via the cable when the electrical network is in the first state.

13. The method as claimed in claim 3, and wherein the connector ensures a connection communicationwise between the cable and a communication network of the underwater vehicle when the cable is mechanically coupled to the connector, the communication network being configured to link the receiving antenna communicationwise to the cable so as to allow measurements carried out by the physical receiving antenna to be transmitted to the cable when the power network is in the first state.

14. The method as claimed in claim 3, comprising processing means comprising a set of at least one processor able to process measurements delivered by the physical receiving antenna, the processing means being configured so that a processor of the set of at least one processor processes measurements delivered by the physical receiving antenna solely when the underwater vehicle is mechanically connected to the cable.

15. The method for controlling an electrical network of an underwater vehicle as claimed in claim 1, the method further comprising:
    simultaneously powering all the acoustic sensors of the two receiving antennas when the underwater vehicle is mechanically coupled to the cable,
    powering only a subset of acoustic sensors of each of the parallel receiving antennas, when the underwater vehicle is mechanically decoupled from the cable,
    wherein the physical receiving antenna comprises two linear arrays of acoustic sensors, each linear array comprising a set of acoustic sensors, the acoustic sensors of the set being adjacent, the acoustic sensors of two sets being different.

16. A method for controlling a communication network of an underwater vehicle, the method comprising:

linking a first set of sensors, containing a first number of acoustic sensors, communicationwise with a cable when the underwater vehicle is mechanically coupled to the cable, and linking a second set of acoustic sensors, containing a second number of acoustic sensors lower than the first number, communicationwise with a memory of the underwater vehicle when the underwater vehicle is mechanically decoupled from the cable, wherein the underwater vehicle comprises:

a propeller able to propel the underwater vehicle;

a synthetic aperture sonar comprising a set of at least one physical antenna for receiving acoustic waves, wherein the at least one physical receiving antenna comprises a plurality of acoustic sensors;

a connector able to mechanically couple removably the cable to the underwater vehicle so as to allow the underwater vehicle to be towed by a surface vehicle; and an electrical network able to convey electrical power to the receiving antenna, the electrical network being configured so as to have a plurality of states wherein it is able to convey electrical power to different sets of acoustic sensors containing different respective numbers of acoustic sensors, wherein the electrical network is able to be in at least one first state and in at least one second state wherein the electrical network is able to convey electrical power to a number of acoustic sensors lower than the number of acoustic sensors powered in each first state, and wherein the connector ensures a connection communicationwise between the cable and a communication network of the underwater vehicle when the cable is mechanically coupled to the connector, the communication network being configured to link the receiving antenna communicationwise to the cable so as to allow measurements carried out by the physical receiving antenna to be transmitted to the cable when the power network is in the first state.

17. The control method as claimed in claim 16, the method further comprising the following steps:

transmitting measurements generated by the first set of sensors to the cable, when the vehicle is mechanically coupled to the cable, transmitting measurements generated by the second set of sensors to the memory, when the vehicle is mechanically decoupled from the cable.

\* \* \* \* \*